Figure 1:
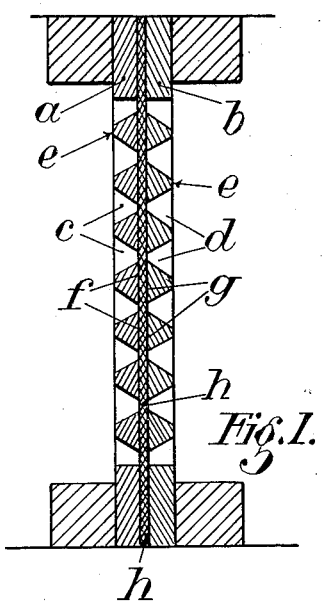

July 22, 1930.　　　F. LAWACZECK　　　1,771,091

ELECTROLYTIC CELL

Filed Aug. 24, 1925

Inventor:
Franz Lawaczeck
by [signature]
Atty.

Patented July 22, 1930

1,771,091

UNITED STATES PATENT OFFICE

FRANZ LAWACZECK, OF MUNICH, GERMANY, ASSIGNOR TO THE FIRM LAWACZECK GESELLSCHAFT MIT BESCHRANKTER HAFTUNG, OF BERLIN, GERMANY

ELECTROLYTIC CELL

Application filed August 24, 1925, Serial No. 52,134, and in Germany September 1, 1924.

My invention relates to electrolytic cells and more especially to an arrangement of electrodes in such cells and it is an object of my invention to so arrange said electrodes that minimum resistance and maximum current density are combined with good separation and discharging of the products of decomposition. To this end, the electrodes in the cells are arranged in close vicinity, provided with perforations forming passages for the products of decomposition and are insulated on the adjacent or inner faces.

In numerous electrolytic processes, for instance the decomposition of water by electric energy, serious difficulties are involved by the problem of, on the one hand, keeping the inner resistance of the cell as small as practicable in order to reduce the energy consumption and to increase the current density, that is, the amount of current flowing through the unit surface of electrodes and, on the other hand to obtain the products of decomposition, for instance, hydrogen and oxygen, separate and in absolutely pure condition. The inner resistance of the cell is a function of the distance travelled by the current in the electrolyte and so this distance should be small in order to reduce the resistance. If, however, the electrodes are placed the shortest possible distance apart, the danger of mixing of the generally gaseous products of decomposition is increased.

Products of decomposition will not form where the electrodes are insulated, that is, on the inner faces of the electrodes, so that their outer faces are principally active. Consequently, notwithstanding the fact that the electrodes are arranged in close vicinity and perforated with the object of reducing the resistance to the current and of obtaining great current densities, this method of insulation prevents separation of gases, which develop in considerable quantities with the existing high current density, at points where an undesirable mixing of such gases might occur and definite passages are provided for the gases, the perforations of the electrodes and their walls being utilized as gas discharge passages.

Figure 2:
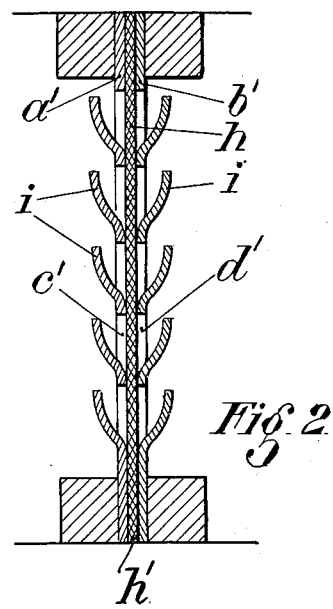
Figure 3:
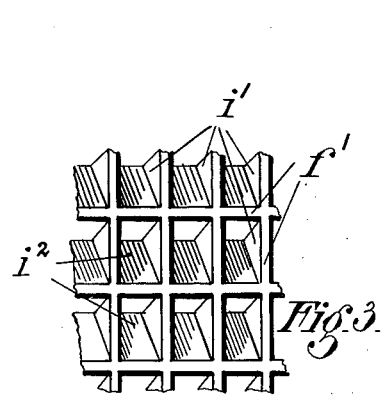
Figure 4:
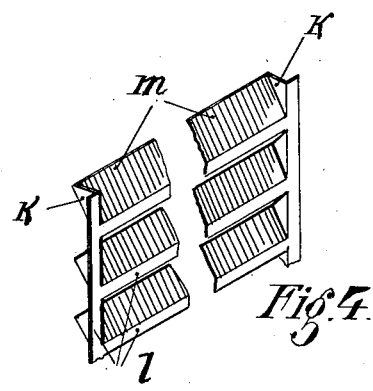
Figure 5:
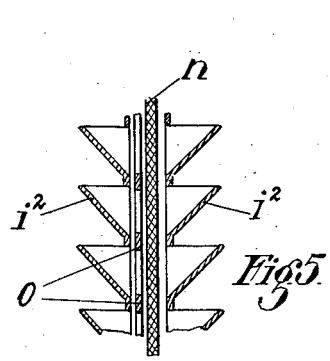
Figure 6:
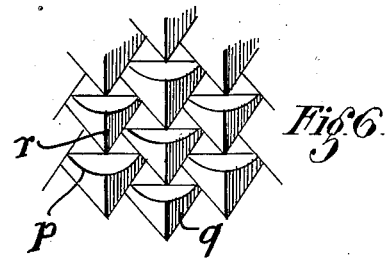

In the drawings affixed to this specification and forming part thereof electrodes designed and arranged in accordance with my invention are illustrated diagrammatically by way of example. In the drawings:

Fig. 1 is a cross-section of a pair of plate electrodes,

Figs. 2 to 6 illustrate various modifications of electrodes made from sheet metal, Fig. 2 is a cross-section of a pair of electrodes in which gas passages are formed by punching tongues out of the body of the electrode, Figs. 3 and 4 are perspective views of the rear faces of electrodes in which the passages are V-shaped or pocket-shaped and extend substantially all over the surface of the electrode, Fig. 5 is a cross-section of a pair of electrodes as shown in Figs. 3 or 4, Fig. 6 is a perspective view of an electrode having staggered triangular passages.

Referring now to Fig. 1, $a$ and $b$ are electrodes shaped as plates, or similarly, and provided with holes, slots or other perforations $c$, $d$ which preferably are arranged registering with the object of facilitating the flow of current. In order to promote the discharge of the gas which is developed, these perforations are preferably extended towards the outer face $e$ of each electrode. The inner faces of the electrodes are insulated from one another by a layer of enamel, hard rubber, lacquer, paint or the like. As shown, a diaphragm $h$ of any suitable type, for instance asbestos-cloth may be inserted between the faces so insulated, but such faces may also be in direct contact. Where diaphragm is provided, the electrodes may be arranged at a short distance from said diaphragm and their faces $f$, $g$ need only be partly insulated in this case. Preferably however they are completely insulated and the insulating layer may also extend into the perforations, so that said perforations are coated with insulating material all over or only in the vicinity of the opposite electrode. The diaphragm may also be of material which is insulating in a dry condition and it is possible to insulate the electrodes by strongly forcing them with their inner faces $f$, $g$ on the diaphragm.

If the diaphragm is of insulating material the insulation of the electrodes themselves may be dispensed with.

Referring now to Figs. 2 to 6 these show electrodes of sheet metal in which, due to the character of the material, suitable gas passages may be more readily formed than in the electrodes shown in Fig. 1. This not only improves the conditions of gas discharge but also reduces the liability of mixing of gases. Preferably the perforations are made by punching or similar operations so as to form tongues in the plate which are bent away from the face of the electrode. In this manner passages are formed which are wider at the end than at the root. Instead of punching tongues out of the electrode passages may be formed by depressions in the electrode.

In this manner substantially V-shaped passages are obtained. This form is preferred because it not only provides suitable gas passages, but also increases the surfaces of the electrodes.

In the modification illustrated in Fig. 2 the electrodes $a'$, $b'$ which may be separated by a diaphragm $h'$ and insulated as described with reference to Fig. 1, are made of sheet metal from which tongues $i$ are punched and bent away from each electrode on its outside so that substantially I-shaped pockets are obtained in connection with perforations $c'$ and $d'$ at the upper end of which the gases are free to escape.

As shown in Fig. 3 the pockets are made with flanges $i'$ at right angles to the electrode which are connected by inclined webs $i^2$ and it will appear that the inner face $f'$ of the electrode is grid-shaped.

Instead of superimposed parallel rows of separate pockets, as in Fig. 3, I may also combine the pockets of a row into a single pocket extending all over the width of an electrode as shown in Fig. 4, where the pockets are formed from flanges $k$ extending at right angles to the electrode $l$ and projecting on the outside thereof, and inclined webs $m$ connecting such flanges.

Fig. 5 is a cross section of an electrode constructed in accordance with Fig. 3 or Fig. 4. These electrodes may be insulated as described and a diaphragm $n$ may be inserted between them, but it is also possible to provide an independent insulator. For instance, independent insulators $o$, of hard rubber or other suitable material, and perforated or grid-shaped like the electrodes themselves may be inserted between one or both electrodes and the diaphragm $n$. In addition the electrodes themselves may be insulated, for instance on the inner faces of the pocket, as described.

It is also possible to coat the surfaces to be insulated with an adhesive, transferring said adhesive to the diaphragm, forcing said electrodes against said diaphragm and to secure powdered insulating material, for instance glass, to the adhesive while it is plastic.

A great advantage of arranging the diaphragm, between the electrodes, is that the diaphragm which as mentioned may be of asbestos cloth, is held under pressure and so protected from damage on its entire surface and cannot be displaced, roughened or shredded during the process.

Instead of pockets of rectangular, longitudinal section as shown in Figs. 3 and 4, the walls at the corners of which are at substantially right angles to one another, it is also possible to construct the pockets with walls inclined at the corners as shown in Fig. 6 where the pockets are of substantially triangular longitudinal section and their walls $p$ and $q$ meet at any desired angle along the ridge $r$. The rows of pockets may also be staggered as indicated in that figure.

It would be feasible to form each electrode as a single large pocket, but obviously it is preferable to provide each electrode with a large number of closely pitched pockets as shown in Figs. 3 and 4.

The shape of the pockets is determined by the condition of facilitating the discharge of the gases. They may be extended towards the top, as illustrated, if the gases or other products of decomposition are lighter than the electrolyte or they may be extended towards the bottom if such products are heavier than the electrolyte. The angle included by the webs $i^2$ or $m$ and the electrode is selected so as to obtain rapid discharge of such products. As the quantity of such products per unit of time is often different in each electrode of a pair the angle of such walls may be varied in the two electrodes. With a suitable inclination of such webs for a gas which is lighter than the electrolyte it is possible to impart the gas bubbles forming below said wall a direction which conducts the gas away from the diaphragm or the place where it has been formed, making room for the freshly generated gas, but at the same time preventing its getting into the range of the other electrode and mixing with the gas generated at this electrode, each gas being conducted to the collector separately and in a well defined path.

I wish it to be understood that I do not desire to be limited to the exact details of construction shown and described, for obvious modifications will occur to a person skilled in the art.

I claim:—

1. An electrolytic cell comprising a pair of coordinate perforated electrodes arranged parallel to each other in close relation over a large area, and an insulating coating on adjacent surfaces of said electrodes and extending along the perforations of said electrodes.

2. An electrolytic cell containing at least one pair of coordinate electrodes, said electrodes being arranged closely adjacent each other over a large face of each, portions of said electrodes being forced away from the adjacent electrode leaving openings through said electrodes, and insulating means between said electrodes preventing electrolytic action on the faces of said electrodes facing each other.

3. An electrolytic cell as in claim 2 wherein the portions of said electrodes extending away from the adjacent electrode is pointed in the desired direction of flow of the product of electrolysis.

In testimony whereof I affix my signature.
FRANZ LAWACZECK.